(12) United States Patent
Hogan et al.

(10) Patent No.: US 9,876,586 B2
(45) Date of Patent: Jan. 23, 2018

(54) SYSTEM FOR ELECTROMAGNETIC INTERFERENCE NOISE REDUCTION WITHIN AN ENCLOSURE

(71) Applicant: Lenovo Enterprise Solutions (Singapore) Pte. Ltd., Singapore (SG)

(72) Inventors: Michael William James Hogan, Kanata (CA); Stephen John Flint, Kanata (CA); Lucian Rusu, Ottawa (CA)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 107 days.

(21) Appl. No.: 14/681,013

(22) Filed: Apr. 7, 2015

(65) Prior Publication Data

US 2016/0301132 A1    Oct. 13, 2016

(51) Int. Cl.
*G01R 27/28* (2006.01)
*H04B 17/00* (2015.01)
*H04B 15/02* (2006.01)
*H01Q 1/52* (2006.01)

(52) U.S. Cl.
CPC .............. *H04B 15/02* (2013.01); *H01Q 1/52* (2013.01)

(58) Field of Classification Search
CPC ................................. H04B 15/02; H01Q 1/52
USPC ............................... 324/326, 627; 455/226.4
See application file for complete search history.

(56) References Cited

U.S. PATENT DOCUMENTS

| | | | | |
|---|---|---|---|---|
| 5,173,706 A | * | 12/1992 | Urkowitz | G01S 7/032 342/101 |
| 6,184,841 B1 | * | 2/2001 | Shober | H01Q 1/22 342/44 |
| 8,666,347 B2 | * | 3/2014 | Wilkerson | H04B 1/109 455/278.1 |
| 2001/0018331 A1 | * | 8/2001 | Kuehn | H03G 3/345 455/63.1 |
| 2010/0240327 A1 | * | 9/2010 | Lambrecht | H01Q 1/243 455/95 |

* cited by examiner

*Primary Examiner* — Farhana Hoque
(74) *Attorney, Agent, or Firm* — Zilka-Kotab, P.C.

(57) ABSTRACT

A radio frequency (RF) noise reduction system is disclosed to include a first antenna for receiving a RF signal, a phase shifter coupled to the first antenna for generating a phase shifted RF signal, and an amplitude detector coupled to the first antenna for outputting a signal representative of an amplitude of the RF signal. Additionally, the RF noise reduction system includes a microcontroller coupled to the amplitude detector for controlling the phase shifter. Still yet, the RF noise reduction system includes a second antenna coupled to the phase shifter and being configured to transmit the phase shifted RF signal.

20 Claims, 5 Drawing Sheets

SYSTEM FOR ELECTROMAGNETIC INTERFERENCE NOISE REDUCTION WITHIN AN ENCLOSURE

FIELD OF THE INVENTION

The present invention relates to electromagnetic interference (EMI) reduction, and, more particularly, this invention relates to reducing radio frequency (RF) noise within an enclosure.

BACKGROUND

As the number of interfaces within a single hardware cabinet or enclosure increases, it becomes increasingly difficult to control and contain the electromagnetic emissions radiated out of the enclosure. Similarly, as traffic rates increase of the devices within the enclosure, it becomes increasingly difficult to control and contain the electromagnetic emissions radiated out of the enclosure.

This issue is likely to become even more pronounced as traffic rates jump from 10 Gbps to 25 Gbps, and beyond, and wavelengths of the associated radio frequency (RF) radiation shrink. Shorter wavelength RF radiation may effectively use small openings in the enclosure as a slot antenna, transmitting the RF radiation beyond the enclosure and into the environment of the enclosure. Accordingly, RF leakage may be more pronounced at certain points of an enclosure, such as at a vented top.

Various regulatory agencies promulgate standards that limit the radiated emissions from hardware devices, such as servers and switches, and the enclosures that contain these devices. Some of these standards may be difficult to meet at particular frequencies. For example, switches operating at 10 Gbps may result in a substantial amount of radiation leakage at approximately 10 GHz.

Various solutions exist that attempt to mitigate or eliminate transmission of RF radiation. These solutions include enclosure gaskets, shielding, and other absorption materials. Use of these solutions can be cumulatively expensive, and may not be adequate for successfully passing radiated emissions testing.

SUMMARY

A radio frequency (RF) noise reduction system is disclosed to include a first antenna for receiving a RF signal, a phase shifter coupled to the first antenna for generating a phase shifted RF signal, and an amplitude detector coupled to the first antenna for outputting a signal representative of an amplitude of the RF signal. Additionally, the RF noise reduction system includes a microcontroller coupled to the amplitude detector for controlling the phase shifter. Still yet, the RF noise reduction system includes a second antenna coupled to the phase shifter and being configured to transmit the phase shifted RF signal.

A method for reducing radio frequency (RF) noise according to one embodiment includes receiving a first RF signal, determining a first amplitude of the first RF signal, and generating a phase shifted RF signal by phase shifting the first RF signal. The phase shifted RF signal is transmitted as output. A second RF signal and the transmitted phase shifted RF signal are received, and a second amplitude of the second RF signal is determined. A minimum RF envelope is identified based on at least the first amplitude and the second amplitude.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments for reducing noise from electromagnetic interference within an enclosure, and/or related systems and methods.

In one general embodiment, a radio frequency (RF) noise reduction system comprises a first antenna for receiving a RF signal, a phase shifter coupled to the first antenna for generating a phase shifted RF signal, and an amplitude detector coupled to the first antenna for outputting a signal representative of an amplitude of the RF signal. The RF noise reduction system further comprises a microcontroller for controlling the phase shifter. Still yet the RF noise reduction system comprises a second antenna coupled to the phase shifter, the second antenna being configured to transmit the phase shifted RF signal.

In another general embodiment, a method for reducing RF noise comprises receiving a first RF signal, determining a first amplitude of the first RF signal, generating a phase shifted RF signal by phase shifting the first RF signal, transmitting the phase shifted RF signal as output, receiving a second RF signal and the transmitted phase shifted RF signal, determining a second amplitude of the second RF signal, and identifying a minimum RF envelope based on at least the first amplitude and the second amplitude.

Figure 1:
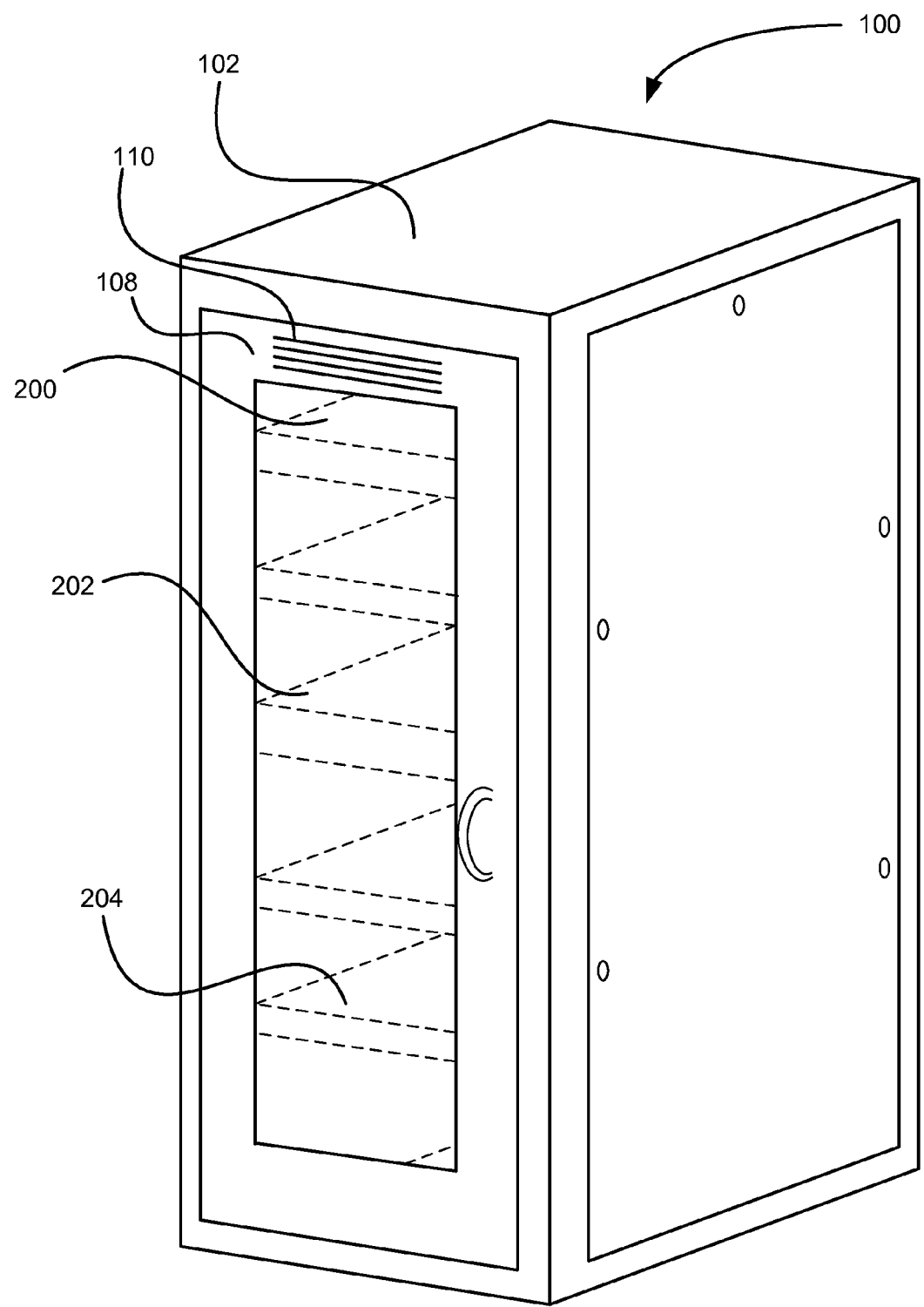
FIG. 1 is a drawing of an enclosure system, in accordance with one embodiment.

FIG. 1 depicts a system 100, in accordance with one embodiment. As an option, the system 100 may be implemented in conjunction with features from any other embodiment listed herein, such as those described with reference to the other FIGS. Of course, however, such system 100 and others presented herein may be used in various applications and/or in permutations which may or may not be specifically described in the illustrative embodiments listed herein. Further, the system 100 presented herein may be used in any desired environment.

As shown in FIG. 1, the system 100 includes an enclosure 102. Enclosure 102 may be any cabinet that houses or holds information technology (IT) hardware, and/or other electronic devices. To place the present embodiment in a context, and solely by way of example, much of the present description will refer to IT hardware. Again, this is done by way of example only, and the teaching herein may be applied to any type of electronic hardware.

In various embodiment, enclosure 102 may be a full-size IT cabinet, a climate controlled cabinet, a data cabinet, a networking cabinet, a server cabinet, or a seismic cabinet.

Referring to FIG. 1, the system 100 is shown to include information technology (IT) hardware 200, 202, and 204. In one embodiment, the IT hardware 200-204 housed in the enclosure 102 may include networking hardware, such as one or more switches, routers, wireless access points, multiplexers, and/or encryption hardware. In another embodiment, the IT hardware 200-204 housed in the enclosure 102 may include one or more computers and/or servers. In yet another embodiment, the IT hardware 200-204 housed in the enclosure 102 may include power-related equipment, such as power supplies, surge protectors, power distribution units, and uninterruptable power supplies.

Of course, the enclosure 102 may concurrently house any combination of networking hardware, computers, servers, and/or power-related equipment.

Further, the enclosure may include a plurality of openings, such as vents, fan intakes, spaces between one or more doors and a chassis of the enclosure 102, spaces between various components of the chassis, and/or ports for wiring, such as networking cables and power cables. Any of these openings may operate as an antenna for emitting/allowing escape of radio frequency (RF) radiation emitted from the IT hardware 200-204 housed within the enclosure 102.

For example, as shown in FIG. 1, a faceplate 108 at a front of the enclosure 102 includes a plurality of air vents 110 that may, undesirably, act as a slot antenna for RF emissions radiated from the IT hardware 200-204.

In an embodiment, the IT hardware 200-204 may include one or more pizza box enclosures. For example, the IT hardware 200-204 may include a 1U or 2U or 3U enclosed rack unit that contains networking or computing hardware, and the enclosed rack unit may be further housed in the enclosure 102. In such an embodiment, each pizza box enclosure may include its own faceplate, and the enclosure 102 may not include a faceplate 108.

Figure 2:
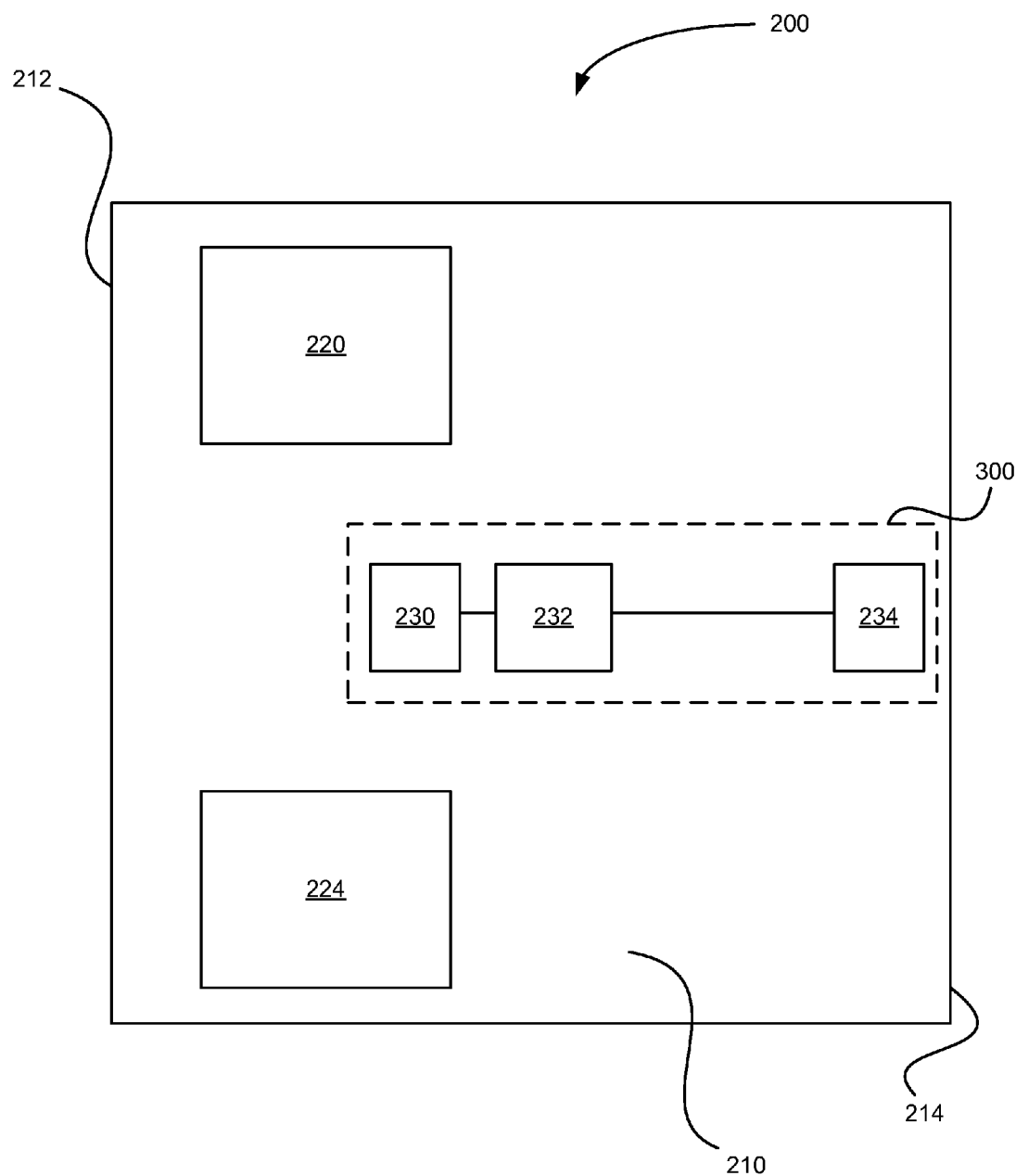
FIG. 2 is a layout view of a circuit board of IT hardware, in accordance with one embodiment.

FIG. 2 depicts a layout of IT hardware 200 with a noise reducing system, in accordance with one embodiment. As an option, the IT hardware 200 may be implemented in conjunction with features from any other embodiment listed herein, such as those described with reference to the other FIGS. Of course, however, IT hardware 200 and other hardware types presented herein may be used in various applications and/or in permutations which may or may not be specifically described in the illustrative embodiments listed herein. Further, the IT hardware 200 presented herein may be used in any desired environment.

As shown in FIG. 2, the IT hardware 200 includes one or more noise sources 220 and 224. The IT hardware 200 is also shown to include a system 300 for reducing noise associated with the EMI generated by the noise sources 220-224. As depicted in FIG. 2, the system 300 includes antennas 230 and 234, as well as an electromagnetic interference (EMI) canceller 232. Further, the noise sources 220-224 and the system 300 are shown coupled to a circuit board 210. For example, the noise sources 220-224 and the system 300 may be installed on the circuit board 210. The circuit board 210 may include a printed circuit board (PCB). Further, the circuit board 210 may be a component of networking hardware, a computer, a server, and/or power-related equipment, as discussed above.

Each of the noise sources 220-224 may include any electronic device that generates EMI. For example, one or more of the noise sources 220-224 may include a transceiver, switch, oscillator, and/or other source of RF emissions. As used herein, EMI or RF noise or RF emissions may refer to any electromagnetic induction and/or electromagnetic radiation emitted from one or more external sources that disturbs an electrical circuit.

Although the IT hardware 200 of FIG. 2 is shown to include two noise sources 220-224, the IT hardware 200 may include any number of noise sources less than or greater than two.

Further, the system 300 is shown configured such that the antenna 230 is located more proximal to a front 212 of the IT hardware 200, and the antenna 234 is located more proximal to a rear 214 of the IT hardware 200. In various embodiments, the IT hardware 200 may positioned in the enclosure 102 such that the front 212 of the IT hardware 200 is adjacent to the faceplate 108 of the enclosure 102. Further, the IT hardware 200 may positioned in the enclosure 102 such that the rear 214 of the IT hardware 200 is adjacent to a rear of the enclosure 102.

In one embodiment, the antenna 230 is a receiving antenna for the system 300, and the antenna 234 is a transmitting antenna for the system 300, as will be set forth in more detail below. Configuration of the system 300 such that the antenna 234 is located more proximal to the rear of the enclosure than the antenna 230 may help to prevent transmissions from the antenna 234 from leaking through the front of the enclosure 102. Further, through operation of the EMI canceller 232, RF signal received at the receiving antenna 230 may be reduced, thereby resulting in a reduction of the level of RF emissions leaking from an enclosure of the IT hardware 200.

Figure 3:
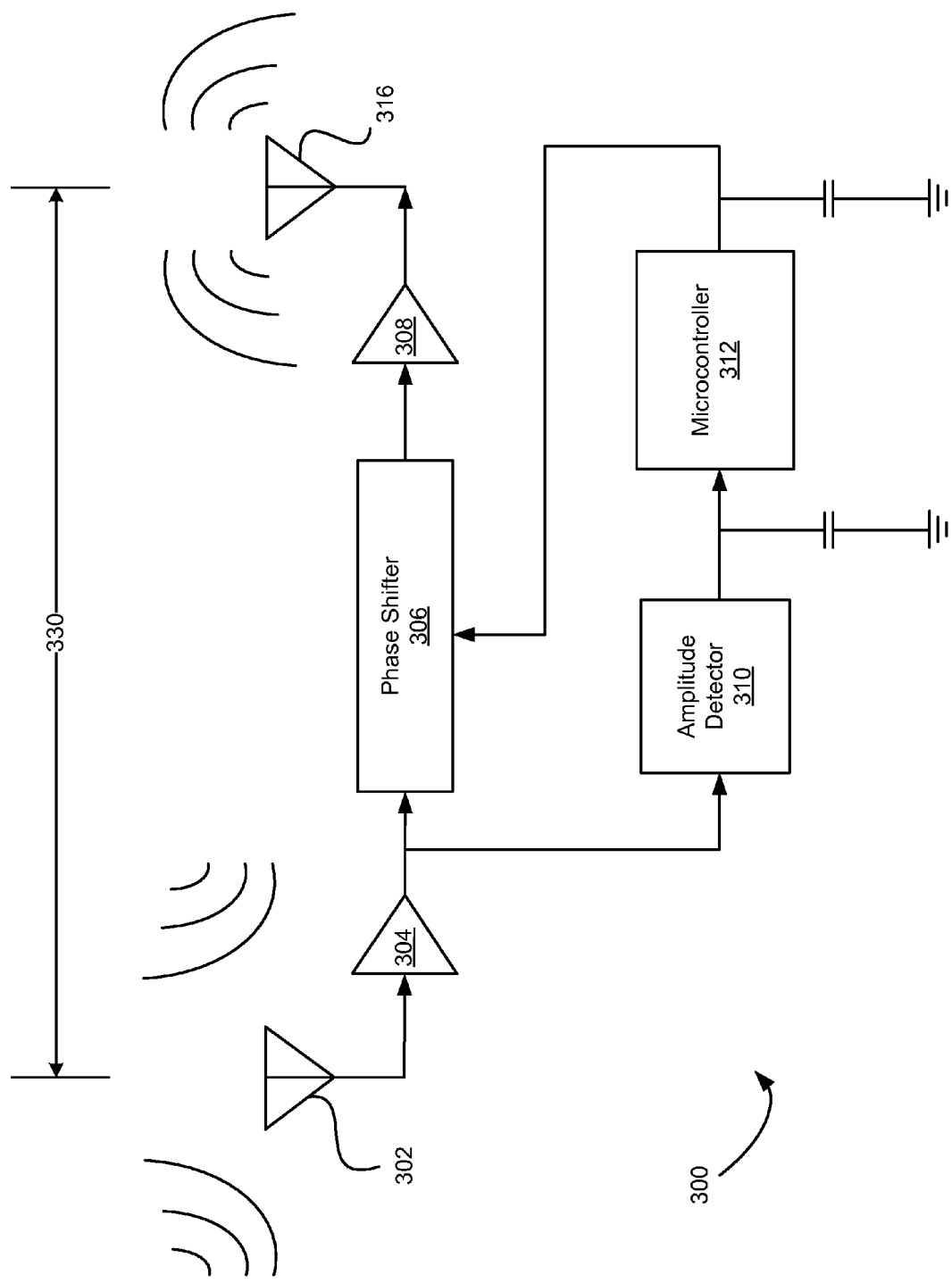
FIG. 3 is a drawing of a system for reducing electromagnetic interference, in accordance with one embodiment.

FIG. 3 depicts the system 300 for reducing electromagnetic interference, in accordance with one embodiment. As an option, the present system 300 may be implemented in conjunction with features from any other embodiment listed herein, such as those described with reference to the other FIGS. Of course, however, such system 300 and others presented herein may be used in various applications and/or in permutations which may or may not be specifically described in the illustrative embodiments listed herein. Further, the system 300 presented herein may be used in any desired environment.

The system 300 is shown to include a receiving antenna 302 and a transmitting antenna 316. The receiving antenna 302 may be substantially identical to the antenna 230 previously described in the context of FIG. 2. The transmitting antenna 316 may be substantially identical to the antenna 234 previously described in the context of FIG. 2. System 300 is further shown to include amplifiers 304 and 308, a phase shifter 306, an amplitude detector 310, and a microcontroller 312.

As shown in FIG. 3, the receiving antenna 302 is coupled to the amplifier 304, and the amplifier 304 is coupled to the phase shifter 306 and the amplitude detector 310. Further, the amplitude detector 310 is coupled to the microcontroller 312, which is also coupled to the phase shifter 306. Finally, the phase shifter 306 is further coupled to the amplifier 308, which is coupled to the antenna 316. As used herein, the coupling of two or more devices includes any connection between the two or more devices that allows communication of a signal, such as, for example, the communication of electrical signals along conductive paths.

In various embodiments, the receiving antenna 302 may be any type of antenna capable of receiving an RF signal. For example, the receiving antenna 302 may be a chip antenna, whip antenna, or PCB antenna. Further, the transmitting antenna 316 may be any type of antenna capable of transmitting RF signal. For example, the transmitting antenna 316 may be a chip antenna, whip antenna, or PCB antenna. In one embodiment, the receiving antenna 302 may be identical to the transmitting antenna 316. For example, the transmitting antenna 316 and the receiving antenna 302 may each be discrete chip antennas that are substantially identical. As used herein, an RF signal may refer to EMI, RF noise, or RF emissions received at the receiving antenna 302.

In one embodiment, the amplifier 304 may include any amplifier capable of amplifying the RF signal received by the receiving antenna 302. For example, the amplifier 304 may be a monolithic microwave integrated circuit (MMIC) that amplifies the RF signal received by the receiving antenna 302. In a specific embodiment, the amplifier 304 may be a MMIC that amplifies a specific band of the received RF signal. For example, the amplifier 304 may amplify only the 5-10 GHz band of the RF signal received by the receiving antenna 302. Thus, the amplifier 304 may amplify at least a portion of the RF signal received by the receiving antenna 302.

Further, the amplified RF signal output by the amplifier 304 is received by the phase shifter 306 and the amplitude detector 310. The amplitude detector 310 may comprise any device capable of receiving the amplified RF signal output by the amplifier 304, and then generating a signal that is proportional to the amplitude of the amplified RF signal, such as a DC voltage proportional to the amplitude of the amplified RF signal output by the amplifier 304. The amplitude detector 310 may be configured to operate over a particular frequency range.

In one embodiment, the amplitude detector 310 may comprise a high frequency amplitude detector. Further, the amplitude detector 310 may include a rectifier that rectifies the amplified RF signal output by the amplifier 304.

As shown in FIG. 3, the signal output by the amplitude detector 310 is then received by the microcontroller 312. As noted above, the signal output by the amplitude detector 310 may be representative of the amplitude of the amplified RF signal. For example, the amplitude detector 310 may output a voltage representative of the amplitude of the amplified RF signal.

The microcontroller 312 may receive the signal from the amplitude detector 310 at an analog to digital (A/D) input channel of or coupled to the microcontroller 312. The microcontroller 312 may be configured to reduce the amplitude of the detected RF envelope at the receiving antenna 302 by increasing and/or decreasing a voltage output to the phase shifter 306. The voltage output to the phase shifter 306 may be determined by the microcontroller 312 based on a predetermined algorithm. For example, the microcontroller 312 may be configured to alter the output voltage such that the amplified RF signal received from the amplifier 304 at the phase shifter 306 is phase shifted at two or more angles.

After phase shifting the amplified RF signal at the two or more angles, the microcontroller 312 may identify a minimum RF input envelope that occurs at a particular angle, or between two or more angles.

The microcontroller 312 may output the control voltage to the phase shifter 306 from a D/A output channel of the microcontroller 312. In various embodiments, the phase shifter 306 may include a voltage controlled phase shifter. As a specific example, the phase shifter 306 may comprise a voltage variable surface acoustic wave (SAW) phase shifter.

As noted above, the phase shifter 306 may receive the amplified RF signal output from the amplifier 304, as well as the control voltage output by the microcontroller 312. As the control voltage from the microcontroller 312 is increased or decreased, the phase shifter 306 may shift right or shift left the phase of the amplified RF signal received from the amplifier 304.

In one embodiment, under the control of the microcontroller 312, the phase shifter 306 may shift the phase of the amplified RF signal over a given range, such as, for example, a range of 0-400 degrees. In another example, the phase shift range may include a range of 90-270 degrees, such that the phase shifter 306 may shift the phase of the amplified RF signal through the phase shift range of 90-270 degrees. Of course, the phase shift range may include any range smaller or larger than these ranges.

In another embodiment, the phase shift range may be operative over a given frequency range, such as, for example, 0-400 degrees for between 5-10 GHz, or 90-270 degrees for between 5-10 GHz. In this manner, the phase shifter 306 may be operative to generate a phase inverted high frequency spectrum of the RF radiation received at the receiving antenna 302.

In an embodiment, through software and/or firmware, etc., the microcontroller 312 may be tuned to have a control envelope with a low rate of change (e.g., over seconds, tens of seconds, etc.), to avoid generation of additional EMI due to a rapid or sudden change in the RF envelope. Further, because the control envelope of the microcontroller 312 may be tuned with a low rate of change (e.g., over seconds, tens of seconds, etc.), it may comprise a relatively low cost fully integrated surface-mount device.

After shifting the phase of the amplified RF signal received from the amplifier 304, the phase shifted RF signal is then output from the phase shifter 306 to the amplifier 308. In one embodiment, the amplifier 308 may include any amplifier capable of amplifying the phase shifted RF signal received from the phase shifter 306. For example, the amplifier 308 may be a monolithic microwave integrated circuit (MMIC) that amplifies the phase shifted RF signal. The amplifier 308 may compensate for power loss that occurs at the phase shifter 306.

As shown in FIG. 3, the amplified spectrum is then output from the amplifier 308 to the transmitting antenna 316. As noted above, the transmitting antenna 316 may be any antenna that is physically separated from the receiving antenna 302. For example, the transmitting antenna 316 may be located closer to a rear of an enclosure than the receiving antenna 302. This may reduce the likelihood of harmonics from the transmitting antenna 316 exiting the enclosure as EMI.

In one embodiment, the receiving antenna 302 may be separated from the transmitting antenna 316 by a distance 330. The distance 330 may vary based on application of the system 300. For example, the distance 330, between the receiving antenna 302 and the transmitting antenna 316, may be configured based on the noise sources 220-224. More specifically, the distance 330 may be configured based on the EMI generated by the noise sources 220-224. As an example, the distance 330 may range from 2 inches to 12 inches based on expected or measured noise, such as from the noise sources 220-224. In one embodiment, the distance 330 may be approximately 6 inches.

Of course, the distance 330 may be any distance that precludes saturating the receiving antenna 302 with the RF output of the transmitting antenna 316. Further, the distance 330 may be any distance that allows the RF output of the transmitting antenna 316 to reduce RF emissions at the receiving antenna 302. Still further, the distance 330 may be any distance that prevents the RF output of the transmitting antenna 316 from reaching a front, faceplate, vent, or other feature of an enclosure that would otherwise result in more EMI being introduced into the environment of the enclosure.

Thus, the system 300 may be operative to reduce one or more bandwidths of RF noise generated by various components found within an enclosure. Because the input and output spectrums are substantially the same, but variable in phase, the microcontroller 312 may be able to tune, for example by way of an output voltage, the phase shifter 306 to achieve a minimum input RF envelope at its input (e.g., at the receiving antenna 302). The minimum input RF envelope may coincide with a 180 degree phase shift of the received RF signal at the receiving antenna 302.

In this way, the system 300 may be operative to reduce to a minimum the level of RF noise within and escaping an enclosure. Additionally, the minimum level of RF noise may be achieved by mixing between the original enclosure noise received by the receiving antenna 302 in the 5-10 GHz range, and the variable phase shifted spectrum output by the transmitting antenna 316.

In various embodiments, the system 300 may be inserted and/or removed from various IT hardware based on changing needs. For example. The system 300 may be added to IT hardware based on EMI testing results. Further, the system 300 may be localized to a particular location of the IT hardware based on EMI testing results, such that the system 300 may reduce the RF noise of a particular unit of IT hardware, or of particular components of IT hardware. For example, the system 300 may be implemented near the top of an enclosure in order to reduce EMI leaking from vents at the top of the enclosure.

Additionally, the system 300 may be inserted and/or removed from IT hardware during prototyping, depending on the needs of a given prototyping phase.

Figure 4:
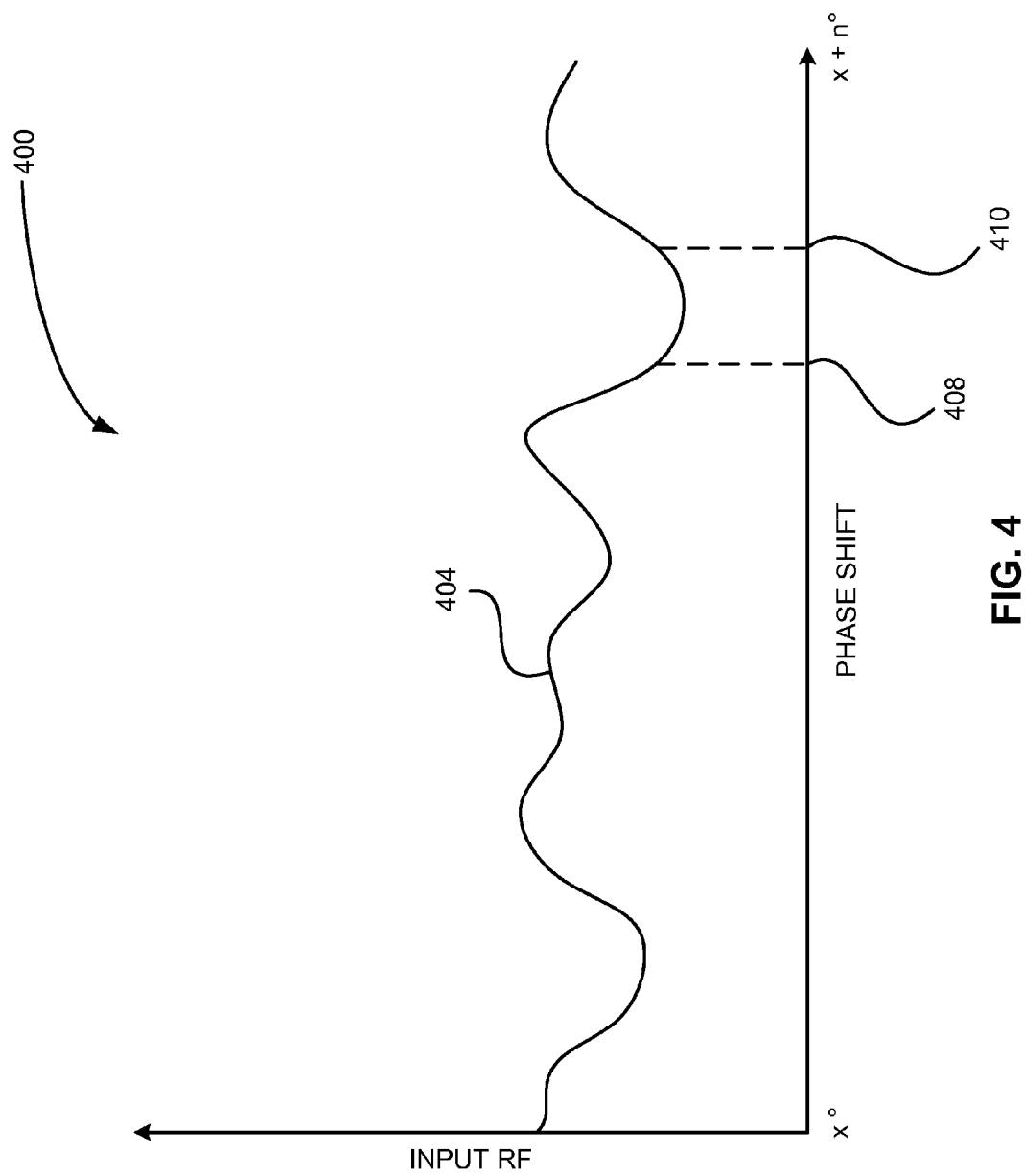
FIG. 4 is a graph of detected radio frequency (RF) signal as a function of a phase shift, in accordance with an embodiment.

FIG. 4 shows a graph 400 of received RF signal amplitude as a function of a phase shift, in accordance with one embodiment. As an option, the graph 400 may be implemented within systems and methods shown in the other FIGS. described herein.

In various embodiments, the amplitude of a received RF signal may be determined at a plurality of applied phase shifts, as represented by plot 404 in the graph 400. The graph 400 shows the amplitude of detected RF signal at a receiving antenna, such as the receiving antenna 302 of FIG. 3, as a function of an applied phase shift across a range of phase shifts that are applied to the input RF signal.

Within the graph 400, amplitude measurements of a received RF signal (y-axis) are shown for a continuous range of applied phase shifts (x-axis), starting from x degrees, and going to x+n degrees. The amplitude of the input RF signal may be determined throughout the phase shift range by way of the microcontroller 312 controlling the phase shifter 306 to apply a phase shift to the RF signal received at the receiving antenna 302, and then transmit the phase shifted RF signal from the transmitting antenna 316. As a result of transmitting the phase shifted RF signal from the transmitting antenna 316, RF signal received at the receiving antenna 302 may be affected (e.g., reduced or augmented), thereby providing a feedback loop for the microcontroller 312.

As noted above, this range may be any configured range. Specific examples set forth above include ranges of 0-400 degrees (i.e., from 0 to 0+400 degrees), and from 90-270 degrees (i.e., from 90 to 90+180 degrees). Of course, any phase shift range may be applied.

Further, as shown in the graph 400, a minimum RF input envelope is found between a first phase shift 408 and a second phase shift 410. In various embodiments, the minimum RF input envelope between the first phase shift 408 and the second phase shift 410 may be identified by a microcontroller, such as the microcontroller 312 of FIG. 3. In response to identifying the minimum RF input envelope, the microcontroller 312 may tune the phase shifter 306 to apply a particular phase shift to received RF signal. The particular phase shift may include the first phase shift 408, the second phase shift 410, or any phase shift therebetween.

In this manner, the system 300 may be operative to reduce within an enclosure RF noise occurring within one or more particular ranges of frequencies.

Figure 5:
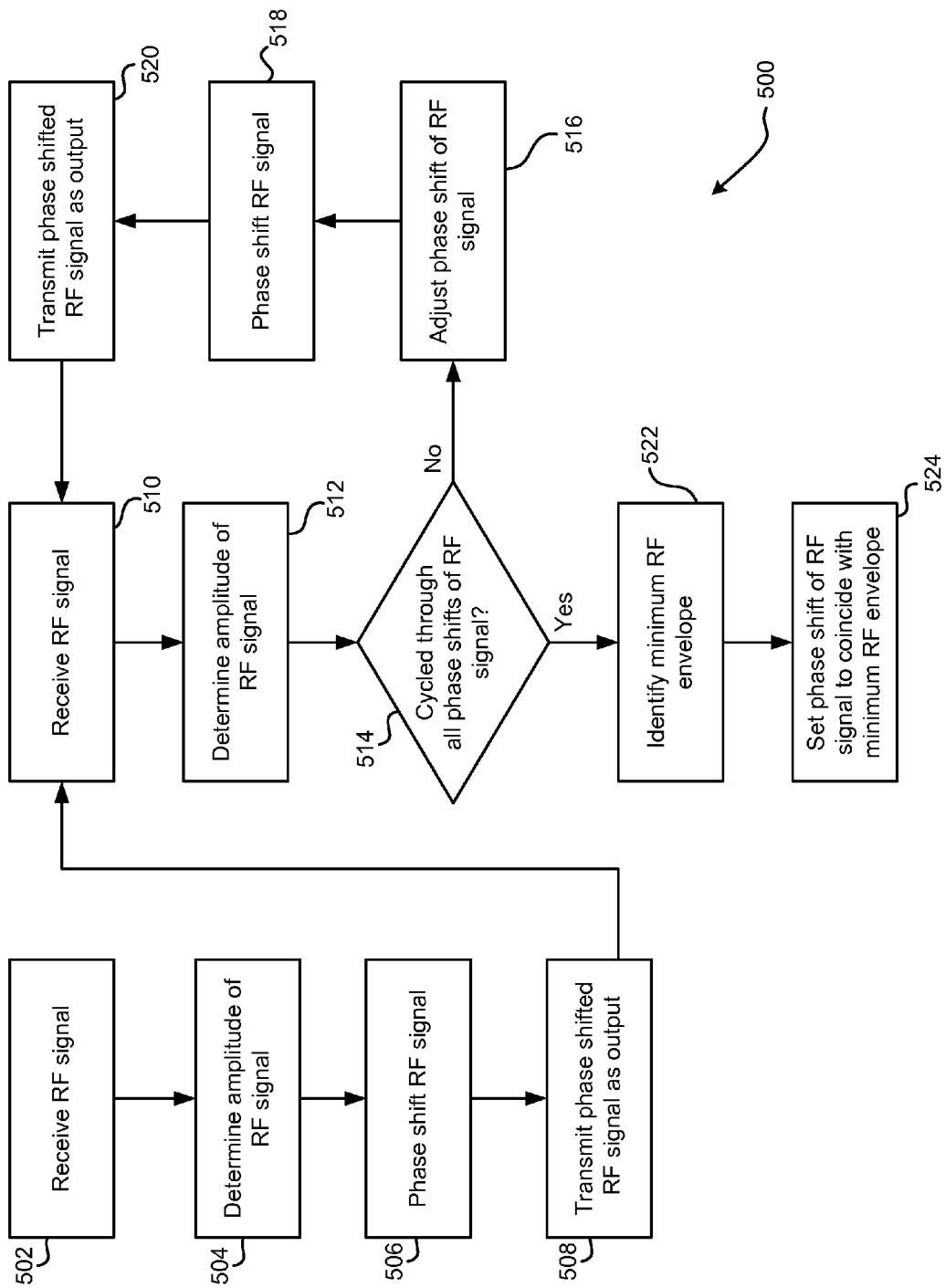
FIG. 5 is a flow diagram of a method for reducing electromagnetic interference, in accordance with one embodiment.

FIG. 5 shows a method 500 for reducing EMI, in accordance with one embodiment. As an option, the present method 500 may be implemented to in various systems and devices, such as those shown in the other FIGS. described herein. Of course, however, this method 500 and others presented herein may or may not be related to the illustrative embodiments listed herein. Further, the methods presented herein may be carried out in any desired environment. Moreover, more or less operations than those shown in FIG. 5 may be included in method 500, according to various embodiments. It should also be noted that any of the aforementioned features may be used in any of the embodiments described in accordance with the various methods.

As shown in FIG. 5, an RF signal is received at operation 502. In various embodiments, the RF signal may be received by an antenna. The RF signal may be received as a result of RF noise or EMI generated by one or more hardware components.

Further, at operation 504, the amplitude of the RF signal is determined. The amplitude of the RF signal may be determined using, for example, a high frequency amplitude detector. Further, at operation 506, the RF signal is phase shifted. The RF signal may be phase shifted by, for example, a voltage variable SAW phase shifter under the control of another device, such as a microcontroller. In such an embodiment, the microcontroller may control the phase shifter based on the amplitude determined at operation 504.

Still further, at operation 508, the phase shifted RF signal is output. The phase shifted RF signal may be output by a transmitting antenna, such as, for example, a chip antenna that is separate from a receiving antenna.

At operation 510, additional RF signal is received, and at operation 512 the amplitude of the additional RF signal is determined. The additional RF signal may be due to RF noise or EMI generated by one or more hardware components, in addition to the phase shifted RF signal output at operation 508. Accordingly, the amplitude of the additional RF signal received at operation 510 may be reduced in comparison to the RF signal received at operation 502 (i.e., due to phase cancellation), or may be greater than the RF signal received at operation 502 (i.e., due to in-phase effects).

At operation 514 it is determined whether all phase shifts have been performed on the received RF signal. This determination may be made, for example, by a microcontroller based on a predetermined range of shifts that will be applied by a phase shifter under control of the microcontroller. If all phase shifts have not yet been applied, the method 500 continues to operation 516. At operation 516, another phase shift is selected for application, and at operation 518 the received RF signal is again phase shifted. Operation 518 may be similar to operation 506, described above, however at operation 518 the received RF signal will be phase shifted by an angle different than the angle applied at operation 506.

Further, at operation 520 the phase shifted RF signal may then be transmitted. Operation 520 may be substantially identical to operation 508, described above.

If, however, at operation 514, it is determined that all phase shifts have been applied, then a minimum RF envelope is identified at operation 522. The minimum RF envelope may be identified, for example, using the previously determined amplitudes (e.g., the amplitudes determined at operations 504, 512). More specifically, each phase shift angle applied to the received RF signal may be associated with a resulting RF signal amplitude. A lower RF signal amplitude may indicate a lower amount of EMI present at a given location, such as at a receiving antenna. Further, at operation 524, a phase shift value or angle may be set for the received RF signal based on the identified minimum RF envelope. More specifically, the phase shift value or angle may be set to coincide with the minimum RF envelope in order to minimize RF noise subsequently experienced within an enclosure.

In this manner, a method is provided for iteratively adjusting application of a phase shift to a received RF signal, and thereby identifying one or more phase shift angles for best reducing the EMI or RF noise in a given environment. Further, the method 500 may provide a feedback loop for reducing EMI by continuously receiving RF signal, analyzing the received RF signal, phase shifting the RF signal, and then transmitting the phase shifted RF signal. In this manner, EMI may be reduced over one or more narrow frequencies of emission.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A radio frequency (RF) noise reduction system, comprising:
a first antenna for receiving a RF signal;
a phase shifter coupled to the first antenna for generating a phase shifted RF signal;
an amplitude detector coupled to the first antenna for outputting a signal representative of an amplitude of the RF signal;
a microcontroller coupled to the amplitude detector for controlling the phase shifter; and
a second antenna coupled to the phase shifter, the second antenna being configured to transmit the phase shifted RF signal; and
an enclosure, at least the first and second antennas being positioned in the enclosure such that the first antenna is more proximal than the second antenna to a faceplate of the enclosure, and the second antenna is more proximal than the first antenna to a rear of the enclosure.

2. The system of claim 1, wherein the first antenna and the second antenna are separated by a distance of 2-12 inches.

3. The system of claim 2, wherein the microcontroller controls the phase shifter to shift a phase of the RF signal by a value in a range of 0 to 400 degrees.

4. The system of claim 2, wherein the microcontroller controls the phase shifter to shift a phase of the RF signal by a value in a range of 90 to 270 degrees.

5. The system of claim 1, wherein the amplitude detector includes a rectifier.

6. The system of claim 5, wherein the system is coupled to a printed circuit board (PCB).

7. The system of claim 6, wherein the PCB is a component of IT hardware.

8. The system of claim 7, wherein the IT hardware comprises networking hardware.

9. The system of claim 8, wherein the networking hardware includes at least one noise source, wherein at least one noise source includes an electronic device that generates electromagnetic interference (EMI).

10. The system of claim 9, wherein the networking hardware is installed in an enclosure such that the system is installed in the enclosure.

11. The system of claim 1, wherein the first antenna comprises a first chip antenna, and the second antenna comprises a second chip antenna.

12. The system of claim 11, comprising a first amplifier between the first antenna and the phase shifter, and a second amplifier between the phase shifter and the second antenna, wherein the first amplifier comprises a first monolithic microwave integrated circuit (MMIC), and the second amplifier comprises a second MMIC.

13. The system of claim 12, wherein the first MMIC amplifies a 10-20 GHz band of the RF signal received by the first antenna.

14. The system of claim 13, wherein the signal representative of the amplitude of the amplified RF signal output by the first amplifier comprises a DC voltage proportional to the amplitude of the amplified RF signal, wherein a rectifier rectifies the amplified RF signal output by the first amplifier to a DC voltage when the amplified RF signal output by the first amplifier is an AC voltage.

15. The system of claim 14, wherein the amplitude detector comprises a high frequency amplitude detector.

16. The system of claim 15, wherein the phase shifter comprises a voltage variable surface acoustic wave (SAW) phase shifter.

17. The system of claim 16, wherein the voltage variable SAW phase shifter generates a phase inverted high frequency spectrum of the RF signal received at the first antenna.

18. A method for reducing radio frequency (RF) noise, comprising:
   receiving a first RF signal;
   determining a first amplitude of the first RF signal;
   generating a phase shifted RF signal by phase shifting the first RF signal;
   transmitting the phase shifted RF signal as output;
   receiving a second RF signal and the transmitted phase shifted RF signal;
   determining a second amplitude of the second RF signal; and
   identifying a minimum RF envelope based on at least the first amplitude and the second amplitude.

19. The method of claim 18, further comprising setting a phase shift value based on the minimum RF envelope.

20. A radio frequency (RF) noise reduction system, comprising:
   a first antenna for receiving a first RF signal;
   an amplitude detector coupled to the first antenna for determining a first amplitude of the first RF signal;
   a phase shifter coupled to the first antenna for generating a phase shifted RF signal by phase shifting the first RF signal;
   a second antenna coupled to the phase shifter for transmitting the phase shifted RF signal; and
   a microcontroller for identifying a minimum RF envelope based on at least the first amplitude and an amplitude of a second RF signal.

* * * * *